US008681999B2

(12) United States Patent
Theverapperuma et al.

(10) Patent No.: US 8,681,999 B2
(45) Date of Patent: Mar. 25, 2014

(54) ENTRAINMENT AVOIDANCE WITH AN AUTO REGRESSIVE FILTER

(75) Inventors: Lalin Theverapperuma, Minneapolis, MN (US); Harikrishna P. Natarajan, Shakopee, MN (US); Arthur Salvetti, Colorado Springs, CO (US); Jon S. Kindred, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 1257 days.

(21) Appl. No.: 11/877,567

(22) Filed: Oct. 23, 2007

(65) Prior Publication Data

US 2008/0130927 A1 Jun. 5, 2008

Related U.S. Application Data

(60) Provisional application No. 60/862,526, filed on Oct. 23, 2006.

(51) Int. Cl.
*H04B 3/20* (2006.01)

(52) U.S. Cl.
USPC ............ 381/66; 381/318; 381/320; 381/71.8; 381/71.11; 381/92; 381/93; 381/312; 381/313

(58) Field of Classification Search
USPC .................. 381/66, 312–313, 318, 320, 71.8, 381/71.11, 92, 93
See application file for complete search history.

(56) References Cited

U.S. PATENT DOCUMENTS

| | | | |
|---|---|---|---|
| 3,601,549 | A | 8/1971 | Mitchell |
| 3,803,357 | A | 4/1974 | Sacks |
| 3,995,124 | A | 11/1976 | Gabr |
| 4,025,721 | A | 5/1977 | Graupe et al. |
| 4,038,536 | A | 7/1977 | Feintuch |
| 4,052,559 | A | 10/1977 | Paul et al. |
| 4,088,834 | A | 5/1978 | Thurmond |
| 4,122,303 | A | 10/1978 | Chaplin et al. |
| 4,130,726 | A | 12/1978 | Kates et al. |
| 4,131,760 | A | 12/1978 | Christensen et al. |

(Continued)

FOREIGN PATENT DOCUMENTS

| | | |
|---|---|---|
| CH | 653508 | 12/1985 |
| DE | 19748079 A2 | 5/1999 |

(Continued)

OTHER PUBLICATIONS

"U.S. Appl. No. 11/276,763, Response filed Jun. 15, 2011 to Final Office Action mailed Sep. 14, 2010", 10 pgs.

(Continued)

*Primary Examiner* — Steven Loke
*Assistant Examiner* — Cuong B Nguyen
(74) *Attorney, Agent, or Firm* — Schwegman, Lundberg & Woessner, P.A.

(57) ABSTRACT

A method of signal processing an input signal in a hearing aid to avoid entrainment, the hearing aid including a receiver and a microphone, the method comprising using an adaptive filter to measure an acoustic feedback path from the receiver to the microphone and adjusting an adaptation rate of the adaptive filter using an output from a filter having an autoregressive portion, the output derived at least in part from a ratio of a predictive estimate of the input signal to a difference of the predictive estimate and the input signal.

20 Claims, 5 Drawing Sheets

(56) References Cited

U.S. PATENT DOCUMENTS

| | | | |
|---|---|---|---|
| 4,185,168 | A | 1/1980 | Graupe et al. |
| 4,187,413 | A | 2/1980 | Moser |
| 4,188,667 | A | 2/1980 | Graupe et al. |
| 4,232,192 | A | 11/1980 | Beex |
| 4,238,746 | A | 12/1980 | Chabries et al. |
| 4,243,935 | A | 1/1981 | McCool et al. |
| 4,366,349 | A | 12/1982 | Adelman |
| 4,377,793 | A | 3/1983 | Horna |
| 4,425,481 | A | 1/1984 | Mansgold et al. |
| 4,471,171 | A | 9/1984 | Kopke et al. |
| 4,485,272 | A | 11/1984 | Duong et al. |
| 4,495,643 | A * | 1/1985 | Orban .......................... 381/94.8 |
| 4,508,940 | A | 4/1985 | Steeger |
| 4,548,082 | A | 10/1985 | Engebretson et al. |
| 4,582,963 | A | 4/1986 | Danstrom |
| 4,589,137 | A | 5/1986 | Miller |
| 4,596,902 | A | 6/1986 | Gilman |
| 4,622,440 | A | 11/1986 | Slavin |
| 4,628,529 | A | 12/1986 | Borth et al. |
| 4,630,305 | A | 12/1986 | Borth et al. |
| 4,658,426 | A | 4/1987 | Chabries et al. |
| 4,680,798 | A | 7/1987 | Neumann |
| 4,731,850 | A | 3/1988 | Levitt et al. |
| 4,751,738 | A | 6/1988 | Widrow et al. |
| 4,771,396 | A | 9/1988 | South et al. |
| 4,783,817 | A | 11/1988 | Hamada et al. |
| 4,783,818 | A | 11/1988 | Graupe et al. |
| 4,791,672 | A | 12/1988 | Nunley et al. |
| 4,823,382 | A | 4/1989 | Martinez |
| 4,879,749 | A | 11/1989 | Levitt et al. |
| 4,985,925 | A | 1/1991 | Langberg et al. |
| 5,016,280 | A | 5/1991 | Engebretson et al. |
| 5,027,410 | A | 6/1991 | Williamson et al. |
| 5,091,952 | A | 2/1992 | Williamson et al. |
| 5,226,086 | A | 7/1993 | Platt |
| 5,259,033 | A | 11/1993 | Goodings et al. |
| 5,276,739 | A | 1/1994 | Krokstad et al. |
| 5,402,496 | A | 3/1995 | Soli et al. |
| 5,502,869 | A | 4/1996 | Smith et al. |
| 5,533,120 | A | 7/1996 | Staudacher |
| 5,619,580 | A | 4/1997 | Hansen |
| 5,621,802 | A | 4/1997 | Harjani et al. |
| 5,668,747 | A | 9/1997 | Ohashi |
| 5,706,352 | A | 1/1998 | Engebretson et al. |
| 5,724,433 | A | 3/1998 | Engebretson et al. |
| 5,737,410 | A | 4/1998 | Vahatalo et al. |
| 5,920,548 | A | 7/1999 | El Malki |
| 6,072,884 | A | 6/2000 | Kates |
| 6,173,063 | B1 | 1/2001 | Melanson |
| 6,219,427 | B1 | 4/2001 | Kates et al. |
| 6,356,606 | B1 * | 3/2002 | Hahm ........................... 375/350 |
| 6,389,440 | B1 | 5/2002 | Lewis et al. |
| 6,434,246 | B1 | 8/2002 | Kates et al. |
| 6,434,247 | B1 | 8/2002 | Kates et al. |
| 6,480,610 | B1 | 11/2002 | Fang et al. |
| 6,494,247 | B1 | 12/2002 | Pedone |
| 6,498,858 | B2 | 12/2002 | Kates |
| 6,552,446 | B1 | 4/2003 | Lomba et al. |
| 6,563,931 | B1 | 5/2003 | Soli et al. |
| 6,718,301 | B1 | 4/2004 | Woods |
| 6,754,356 | B1 | 6/2004 | Luo et al. |
| 6,831,986 | B2 | 12/2004 | Kates |
| 6,876,751 | B1 | 4/2005 | Gao et al. |
| 6,885,752 | B1 | 4/2005 | Chabries et al. |
| 6,912,289 | B2 | 6/2005 | Vonlanthen et al. |
| 6,928,160 | B2 | 8/2005 | Ebenezer et al. |
| 7,006,646 | B1 | 2/2006 | Baechler |
| 7,058,182 | B2 | 6/2006 | Kates |
| 7,065,486 | B1 * | 6/2006 | Thyssen ........................ 704/227 |
| 7,242,777 | B2 | 7/2007 | Leenen et al. |
| 7,283,638 | B2 | 10/2007 | Troelsen et al. |
| 7,283,842 | B2 | 10/2007 | Berg |
| 7,292,699 | B2 | 11/2007 | Gao et al. |
| 7,349,549 | B2 | 3/2008 | Bachler et al. |
| 7,386,142 | B2 | 6/2008 | Kindred |
| 7,519,193 | B2 | 4/2009 | Fretz |
| 7,809,150 | B2 | 10/2010 | Natarajan et al. |
| 7,945,066 | B2 | 5/2011 | Kindred |
| 7,995,780 | B2 | 8/2011 | Pedersen et al. |
| 8,116,473 | B2 | 2/2012 | Salvetti et al. |
| 8,199,948 | B2 | 6/2012 | Theverapperuma |
| 8,452,034 | B2 | 5/2013 | Theverapperuma |
| 2001/0002930 | A1 | 6/2001 | Kates |
| 2001/0055404 | A1 | 12/2001 | Bisgaard |
| 2002/0051546 | A1 | 5/2002 | Bizjak |
| 2002/0057814 | A1 | 5/2002 | Kaulberg |
| 2002/0176584 | A1 | 11/2002 | Kates |
| 2003/0007647 | A1 | 1/2003 | Nielsen et al. |
| 2003/0026442 | A1 | 2/2003 | Fang et al. |
| 2003/0031314 | A1 | 2/2003 | Tanrikulu et al. |
| 2003/0112988 | A1 | 6/2003 | Naylor |
| 2003/0185411 | A1 * | 10/2003 | Atlas et al. ...................... 381/98 |
| 2004/0066944 | A1 | 4/2004 | Leenen et al. |
| 2004/0086137 | A1 | 5/2004 | Yu et al. |
| 2004/0125973 | A1 | 7/2004 | Fang et al. |
| 2004/0190739 | A1 | 9/2004 | Bachler et al. |
| 2004/0202340 | A1 | 10/2004 | Armstrong et al. |
| 2005/0036632 | A1 * | 2/2005 | Natarajan et al. ............... 381/93 |
| 2005/0047620 | A1 | 3/2005 | Fretz |
| 2005/0069162 | A1 | 3/2005 | Haykin et al. |
| 2005/0111683 | A1 | 5/2005 | Chabries et al. |
| 2005/0129262 | A1 | 6/2005 | Dillon et al. |
| 2005/0265568 | A1 | 12/2005 | Kindred |
| 2005/0283263 | A1 | 12/2005 | Eaton et al. |
| 2006/0140429 | A1 | 6/2006 | Klinkby et al. |
| 2006/0222194 | A1 | 10/2006 | Bramslow |
| 2006/0227987 | A1 | 10/2006 | Hasler |
| 2007/0009123 | A1 | 1/2007 | Aschoff et al. |
| 2007/0019817 | A1 | 1/2007 | Siltmann |
| 2007/0020199 | A1 | 1/2007 | Platz et al. |
| 2007/0135862 | A1 | 6/2007 | Nicolai et al. |
| 2007/0217620 | A1 | 9/2007 | Zhang et al. |
| 2007/0217629 | A1 | 9/2007 | Zhang et al. |
| 2007/0219784 | A1 | 9/2007 | Zhang et al. |
| 2007/0223755 | A1 | 9/2007 | Salvetti et al. |
| 2007/0237346 | A1 | 10/2007 | Fichtl et al. |
| 2007/0276285 | A1 | 11/2007 | Burrows et al. |
| 2007/0280487 | A1 | 12/2007 | Ura et al. |
| 2008/0019547 | A1 | 1/2008 | Baechler |
| 2008/0037798 | A1 | 2/2008 | Baechler et al. |
| 2008/0095388 | A1 | 4/2008 | Theverapperuma |
| 2008/0095389 | A1 | 4/2008 | Theverapperuma |
| 2008/0107296 | A1 | 5/2008 | Bachler et al. |
| 2008/0130926 | A1 | 6/2008 | Theverapperuma |
| 2008/0304684 | A1 | 12/2008 | Kindred |
| 2009/0154741 | A1 | 6/2009 | Woods et al. |
| 2009/0175474 | A1 | 7/2009 | Salvetti et al. |
| 2009/0245552 | A1 | 10/2009 | Salvetti |
| 2011/0091049 | A1 | 4/2011 | Salvetti et al. |
| 2011/0116667 | A1 | 5/2011 | Natarajan et al. |
| 2011/0150231 | A1 | 6/2011 | Natarajan |
| 2012/0230503 | A1 | 9/2012 | Theverapperuma |

FOREIGN PATENT DOCUMENTS

| | | | |
|---|---|---|---|
| EP | 0396831 | A2 | 11/1990 |
| EP | 0585976 | A2 | 3/1994 |
| EP | 0335542 | B1 | 12/1994 |
| EP | 1367857 | A1 | 12/2003 |
| EP | 1256258 | B1 | 3/2005 |
| EP | 1538868 | A2 | 6/2005 |
| EP | 1718110 | A1 | 2/2006 |
| EP | 2080408 | B1 | 8/2012 |
| GB | 1356645 | | 6/1974 |
| JP | 59-64994 | | 4/1984 |
| JP | 60-31315 | | 2/1985 |
| WO | WO-0106746 | A2 | 1/2001 |
| WO | WO-0106812 | A1 | 1/2001 |
| WO | WO-0110170 | A2 | 2/2001 |
| WO | WO-03045108 | A2 | 5/2003 |
| WO | WO-2004105430 | A1 | 12/2004 |
| WO | WO-2005002433 | A1 | 1/2005 |
| WO | WO-2005018275 | A2 | 2/2005 |
| WO | WO-2007045276 | A1 | 4/2007 |

(56) References Cited

FOREIGN PATENT DOCUMENTS

| | | | |
|---|---|---|---|
| WO | WO-2007112737 | A1 | 10/2007 |
| WO | WO-2008051569 | A2 | 5/2008 |
| WO | WO-2008051569 | A3 | 5/2008 |
| WO | WO-2008051570 | A1 | 5/2008 |
| WO | WO-2008051571 | A1 | 5/2008 |

OTHER PUBLICATIONS

"European Application Serial No. 07839767.6, Response filed Jun. 2, 2011 to Office Action mailed May 5, 2011", 11 pgs.
"International Application Serial No. PCT/US2007/022549, International Preliminary Report on Patentability mailed May 7, 2009", 8 pgs.
"International Application Serial No. PCT/US2007/022549, International Search Report and Written Opinion mailed Feb. 15, 2008", 12 pgs.
Chankawee, A., et al., "Performance improvement of acoustic feedback cancellation in hearing aids using liner prediction", *Digital Signal Processing Research Laboratory(DSPRL)*, (Nov. 21, 2004), 116-119.
"U.S. Appl. No. 10/854,922, Notice of Allowance mailed Nov. 19, 2007", 9 pgs.
"U.S. Appl. No. 10/857,599, Final Office Action mailed Jun. 11, 2009", 7 pgs.
"U.S. Appl. No. 10/857,599, Final Office Action Mailed Jul. 4, 2008", 9 pgs.
"U.S. Appl. No. 10/857,599, Non-Final Office Action mailed Jan. 26, 2010", 8 pgs.
"U.S. Appl. No. 10/857,599, Non-Final Office Action mailed Dec. 26, 2007", 8 pgs.
"U.S. Appl. No. 10/857,599, Non-Final Office Action mailed Dec. 31, 2008", 6 pgs.
"U.S. Appl. No. 10/857,599, Notice of Allowance mailed Jul. 26, 2010", 10 pgs.
"U.S. Appl. No. 10/857,599, Response filed Apr. 26, 2010 to Non Final Office Action mailed Jan. 26, 2010", 8 pgs.
"U.S. Appl. No. 10/857,599, Response filed Apr. 28, 2008 to Non-Final Office Action mailed Dec. 26, 2007", 7 pgs.
"U.S. Appl. No. 10/857,599, Response filed Apr. 30, 2009 to Non-Final Office Action mailed Dec. 31, 2008", 7 pgs.
"U.S. Appl. No. 10/857,599, Response filed Nov. 12, 2009 to Final Office Action mailed Jun. 11, 2009", 9 pgs.
"U.S. Appl. No. 10/857,599, Response filed Nov. 16, 2007 to Restriction Requirement dated May 21, 2007", 6 pgs.
"U.S. Appl. No. 10/857,599, Response filed Nov. 24, 2008 to Final Office Action mailed Jul. 24, 2008", 9 pgs.
"U.S. Appl. No. 10/857,599, Restriction Requirement mailed May 21, 2007", 5 pgs.
"U.S. Appl. No. 11/276,763, Decision on Pre-Appeal Brief Request mailed Feb. 15, 2011", 3 pgs.
"U.S. Appl. No. 11/276,763, Final Office Action mailed Sep. 14, 2010", 9 pgs.
"U.S. Appl. No. 11/276,763, Non-Final Office Action mailed Apr. 2, 2010", 11 pgs.
"U.S. Appl. No. 11/276,763, Pre-Appeal Brief Request filed Jan. 14, 2011", 5 pgs.
"U.S. Appl. No. 11/276,763, Response filed Jan. 11, 2010 to Restriction Requirement mailed Dec. 10, 2009", 9 pgs.
"U.S. Appl. No. 11/276,763, Response filed Jul. 2, 2010 to Non Final Office Action mailed Apr. 2, 2010", 15 pgs.
"U.S. Appl. No. 11/276,763, Restriction Requirement mailed Dec. 10, 2009", 6 pgs.
"U.S. Appl. No. 11/276,793, Non-Final Office Action mailed May 12, 2009", 20 pgs.
"U.S. Appl. No. 11/276,793, Response filed Nov. 11, 2009 to Non Final Office Action mailed May 12, 2009", 16 pgs.
"U.S. Appl. No. 11/276,795, Advisory Action mailed Jan. 12, 2010", 13 pgs.
"U.S. Appl. No. 11/276,795, Decision on Pre-Appeal Brief Request mailed Apr. 14, 2010", 2 pgs.
"U.S. Appl. No. 11/276,795, Examiner Interview Summary filed Mar. 11, 2011", 1 pg.
"U.S. Appl. No. 11/276,795, Examiner Interview Summary mailed Feb. 9, 2011", 3 pgs.
"U.S. Appl. No. 11/276,795, Final Office Action mailed Oct. 14, 2009", 15 pgs.
"U.S. Appl. No. 11/276,795, Final Office Action mailed Nov. 24, 2010", 17 pgs.
"U.S. Appl. No. 11/276,795, Non Final Office Action mailed May 7, 2009", 13 pgs.
"U.S. Appl. No. 11/276,795, Non-Final Office Action mailed May 27, 2010", 14 pgs.
"U.S. Appl. No. 11/276,795, Notice of Allowance mailed Mar. 18, 2011", 12 pgs.
"U.S. Appl. No. 11/276,795, Pre-Appeal Brief Request mailed Feb. 16, 2010", 4 pgs.
"U.S. Appl. No. 11/276,795, Response filed Jan. 24, 2011 to Final Office Action mailed Nov. 24, 2010", 11 pgs.
"U.S. Appl. No. 11/276,795, Response filed Sep. 8, 2009 to Non-Final Office Action mailed May 7, 2009", 10 pgs.
"U.S. Appl. No. 11/276,795, Response filed Sep. 28, 2010 to Non Final Office Action mailed May 27, 2010", 6 pgs.
"U.S. Appl. No. 11/276,795, Response filed Dec. 14, 2009 to Final Office Action mailed Oct. 14, 2009", 10 pgs.
"U.S. Appl. No. 12/135,856 Non-Final Office Action mailed Sep. 23, 2010", 8 Pgs.
"U.S. Appl. No. 12/135,856, Notice of Allowance mailed Mar. 11, 2011", 9 pgs.
"U.S. Appl. No. 12/135,856, Response filed Dec. 23, 2010 to Non Final Office Action mailed Sep. 23, 2010", 10 pgs.
"European Application Serial No. 07250899.7, European Search Report mailed May 15, 2008", 7 pgs.
"European Application Serial No. 07250899.7, Office Action Mailed Jan. 15, 2009", 1 pgs.
"European Application Serial No. 07250899.7, Office Action mailed Mar. 21, 2011", 3 pgs.
"European Application Serial No. 07250899.7, Response to Official Communication Filed Jul. 13, 2009", 17 pgs.
"European Application Serial No. 07250920, Extended European Search Report mailed May 11, 2007", 6 pgs.
"European Application Serial No. 07839767.6, Office Action mailed May 5, 2011", 4 pgs.
"European Application Serial No. 08253924.8, Search Report mailed on Jul. 1, 2009", 8 pgs.
"European Application Serial No. 09250817.5, Extended European Search Report mailed Nov. 18, 2010", 7 pgs.
Anderson, D. B., "Noise Reduction in Speech Signals Using Pre-Whitening and the Leaky Weight Adaptive Line Enhancer", (Project Report presented to the Department of Electrical Engineering, Brigham Young University), (Feb., 1981), 56 pgs.
Best, L. C., "Digital Suppression of Acoutic Feedback in Hearing Aids", Thesis, Department of Electrical Engineering and The Graduate School of the University of Wyoming, (May, 1985), 66 pgs.
Boll, Steven F., "Suppression of Acoustic Noise in Speech Using Spectral Subtraction", IEEE Transactions on Acoustics, Speech, and Signal Processing, vol. ASSP-27, (Apr. 1979), 113-120.
Bustamante, D. K., et al., "Measurement and Adaptive Suppression of Acoustic Feedback in Hearing Aids", 1989 International Conference on Acoustics, Speech, and Signal Processing, 1989. ICASSP-89., (1989), 2017-2020.
Chabries, D. M., et al., "A General Frequency-Domain LMS Adaptive Algorithm", IEEE Transactions on Acoustics, Speech, and Signal Processing, (Aug. 1984), 6 pgs.
Chazan, D., et al., "Noise Cancellation for Hearing Aids", IEEE International Conference on ICASSP '86. Acoustics, Speech, and Signal Processing,, OTI 000251-255, (Apr. 1986), 977-980.
Christiansen, R. W., "A Frequency Domain Digital Hearing Aid", 1986 IEEE ASSP Workshop on Applications of Signal Processing to Audio and Acoustics, IEEE Acoustics, Speech, and Signal Processing Society, (1986), 4 pgs.

(56) References Cited

OTHER PUBLICATIONS

Christiansen, R. W., et al., "Noise Reduction in Speech Using Adaptive Filtering I: Signal Processing Algorithms", Proceedings, 103rd Conference of Acoustical Society of America, (Apr. 1982), 7 pgs.
Egolf, D. P., et al., "The Hearing Aid Feedback Path: Mathematical Simulations and Experimental Verification", J. Acoust. Soc. Am., 78(5), (1985), 1576-1587.
Kaneda, Y., et al., "Noise suppression. signal processing using 2-point received signals", Electronics and Communications in Japan (Part I: Communications), 67-A(12), (1984), 19-28.
Levitt, H., "A Cancellation Technique for the Amplitude and Phase Calibration of Hearing Aids and Nonconventional Transducers", Journal of Rehabilitation Research, 24(4), (1987), 261-270.
Levitt, H., et al., "A Digital Master Hearing Aid", Journal of Rehabilitation Research and Development, 23(1), (1986), 79-87.
Levitt, H., et al., "A Historical Perspective on Digital Hearing Aids: How Digital Technology Has Changed Modern Hearing Aids", Trends in Amplification, 11(1), (Mar. 2007), 7-24.
Levitt, H., "Technology and the Education of the Hearing Impaired", Chapt. 6: Education of the Hearing Impaired Child, College-Hill Press, (Mar. 1985).
Maxwell, J. A., et al., "Reducing Acoustic Feedback in Hearing Aids", IEEE Transactions on Speech and Audio Processing, 3(4), (Jul. 1995), 304-313.
McAulay, R., et al., "Speech enhancement using a soft-decision noise suppression filter", IEEE Transactions on Acoustics, Speech, and Signal Processing [see also IEEE Transactions on Signal Processing], 28(2), (Apr. 1980), 137-145.
Mueller, Gustav H, "Data logging: Its popular, but how can this feature be used to help patients?", The Hearing Journal vol. 60, No. 10,, XP002528491, (Oct. 2007), 6 pgs.
Paul, Embree, "C algorithms for real-time DSP", Library of Congress Cataloging-In-Publication Data, Prentice Hall PTR, (1995), 98-113, 134-137, 228-233, 147.
Paul, Embree, "C++ Alogrithms for Digital Signal Processing", Prentice Hall PTR, (1999), 313-320.
Preves, D. A., "Evaluation of Phase Compensation for Enhancing the Signal Processing Capabilities of Hearing Aids in Situ", Thesis, Graduate School of the University of Minnesota, (Oct. 1985), 203 pgs.
Preves, David A., "Field Trial Evaluations of a Switched Directional/Omnidirectional In-the-Ear Hearing Instrument", Journal of the American Academy of Audiology, 10(5), (May 1999), 273-283.
Rife, D., et al., "Transfer-Function Measurement With Maximum-Length Sequences", J. Audio Eng. Soc., 37(6), (1989), 419-444.
Rosenberger, J. R., et al., "Performance of an Adaptive Echo Canceller Operating in a Noisy, Linear, Time-Invariant Environment", The Bell System Technical Journal, 50(3), (1971), 785-813.
Saeed, V. Vaseghi, "Echo Cancellation", Advanced Digital Signal Processing and Noise Reduction, Second Edition., John Wiley & Sons, (2000), 397-404.
South, C. R., et al., "Adaptive Filters to Improve Loudspeaker Telephone", Electronics Letters,15(21), (1979), 673-674.
Weaver, K. A., "An Adaptive Open-Loop Estimator for the Reduction of Acoustic Feedback", Thesis, Department of Electrical Engineering and the Graduate School of the University of Wyoming, (Dec. 1984), 70 pgs.
Weaver, K. A., et al., "Electronic Cancellation of Acoustic Feedback to Increase Hearing-Aid Stability", the Journal of the Acoustical Society of America, vol. 77, Issue S1, 109th Meeting, Acoustical Society of America, (Apr. 1985), p. S105.
Widrow, B, et al., "Stationary and nonstationary learning characteristics of the LMS adaptive filter", Proceedings of the IEEE, 64(8), (Aug. 1976), 1151-1162.
Widrow, B., et al., "Adaptive Antenna Systems", Proceedings of the IEEE, 55(12), (Dec. 1967), 2143-2159.
Widrow, B., et al., "Adaptive Noise Cancelling: Principles and Applications", Proceedings of the IEEE, 63(12), (1975), 1692-1716.
Wreschner, M. S., et al., "A Microprocessor Based System for Adaptive Hearing Aids", 1985 ASEE Annual Conference Proceedings, (1985), 688-691.
"Advance Adaptive Feedback Cancellation", *IntriCon: Technology White Paper*, [Online]. Retrieved from the Internet: <URL:http://www.intricondownloads.com/D1/techdemo/WP_Advanced_AFC_rev101006.pdf>, (Oct. 10, 2005), 3 pg.
"Entrainment (Physics)", [Online]. Retrieved from the Internet: <URL: http://en.wikipedia.org/w/index.php?title=Entrainment_(physics)&printable=yes>, (Jun. 18, 2009), 2 pgs.
"Inspiria Ultimate—GA3285", [Online]. Retrieved from the Internet: <URL: http://www.sounddesigntechnologies.com/products_InspiriaUltimate.php>, (Jun. 18, 2009), 4 pgs.
"U.S. Appl. No. 10/854,922, Non Final Office Action mailed Sep. 5, 2006", 13 pgs.
"U.S. Appl. No. 10/854,922, Notice of Allowance mailed May 22, 2007", 7 pgs.
"U.S. Appl. No. 10/854,922, Response filed Mar. 5, 2007 to Non Final Office Action mailed Sep. 5, 2006", 12 pgs.
"U.S. Appl. No. 11/276,763, Notice of Allowance mailed Aug. 25, 2011", 8 pgs.
"U.S. Appl. No. 11/276,763, Notice of Allowance mailed Oct. 11, 2011", 8 pgs.
"U.S. Appl. No. 11/877,317, Non Final Office Action mailed Aug. 18, 2011", 16 pgs.
"U.S. Appl. No. 11/877,317, Response filed Feb. 20, 2012 to Non Final Office Action mailed Aug. 18, 2011", 9 pgs.
"U.S. Appl. No. 11/877,605 , Response filed Jan. 27, 2012 to Non Final Office Action mailed Sep. 27, 2011", 10 pgs.
"U.S. Appl. No. 11/877,605, Non Final Office Action mailed Sep. 27, 2011", 12 pgs.
"U.S. Appl. No. 11/877,606, Final Office Action mailed Dec. 2, 2011", 11 pgs.
"U.S. Appl. No. 11/877,606, Non Final Office Action mailed Jun. 10, 2011", 12 pgs.
"U.S. Appl. No. 11/877,606, Notice of Allowance mailed Feb. 15 2012", 10 pgs.
"U.S. Appl. No. 11/877,606, Response filed Feb. 2, 2012 to Final Office Action mailed Dec. 2, 2011", 9 pgs.
"U.S. Appl. No. 11/877,606, Response filed Sep. 12, 2011 to Non-Final Office Action mailed Jun. 10, 2011", 7 pgs.
"U.S. Appl. No. 12/336,460, Non Final Office Action mailed Sep. 29, 2011", 13 pgs.
"U.S. Appl. No. 12/336,460, Response filed Jan. 30, 2012 to Non Final Office Action mailed Sep. 29, 2011", 25 pgs.
"U.S. Appl. No. 12/336,460, Response filed Jan. 30, 2012 to Non Final Office Action mailed Sep. 29, 2011", 15 pgs.
"U.S. Appl. No. 12/408,928, Non Final Office Action mailed Aug. 4, 2011", 25 pgs.
"U.S. Appl. No. 12/408,928, Preliminary Amendment mailed Jun. 24, 2009", 3 pgs.
"U.S. Appl. No. 12/875,646, Non Final Office Action mailed Jan. 30, 2012", 4 pgs.
"European Application Serial No. 07839768.4, Office Action Received Dec. 9, 2011", 3 pgs.
"International Application Serial No. PCT/US2007/022548, International Preliminary Report on Patentability mailed May 7, 2009", 8 pgs.
"International Application Serial No. PCT/US2007/022548, Search Report mailed Jun. 3, 2008", 7 pgs.
"International Application Serial No. PCT/US2007/022548, Written Opinion mailed Jun. 3, 2008", 8 pgs.
"International Application Serial No. PCT/US2007/022550, International Preliminary Report on Patentability mailed May 7, 2009", 8 pgs.
"International Application Serial No. PCT/US2007/022550, International Search Report and Written Opinion mailed Oct. 23, 2006", 12 pgs.
Beaufays, Francoise, "Transform-Domain Adaptive Filters: An Analytical Approach", IEEE Trans. on Signal Proc., vol. 43(2), (Feb. 1995), 422-431.
Proakis, J. G, et al., "Digital Signal Processing", Prentice-Hall, Inc., XP002481168, (1996), 213-214-p. 536.

(56) References Cited

OTHER PUBLICATIONS

Theverapperuma, Lalin S, et al., "Adaptive Feedback Canceller: Entrainment", Digital Signal Processing Workshop, 4th IEEE, PI, (Sep. 1, 2006), 245-250.
Theverapperuma, Lalin S, et al., "Continuous Adaptive Feedback Canceller Dynamics", Circuits and Systems, 49th IEEE International Midwes T Symposium on, IEEE, PI, (Aug. 1, 2006), 605-609.
Wong, T.W., et al., "Adaptive Filtering Using Hartley Transform and Overlap-Saved method", IEEE Transaction on Signal Processing, vol. 39, No. 7, (Jul. 1991), 1708-1711.
"U.S. Appl. No. 11/877,317, Notice of Allowance mailed Jun. 1, 2012", 12 pgs.
"U.S. Appl. No. 11/877,605, Response filed Jul. 9, 2012 to Final Office Action mailed Apr. 9, 2012", 9 pgs.
"U.S. Appl. No. 11/877,605, Final Office Action mailed Apr. 9, 2012", 17 pgs.
"U.S. Appl. No. 11/877,606, Examiner Interview Summary mailed Feb. 8, 2012", 1 pg.
"U.S. Appl. No. 12/336,460, Response filed Jun. 27, 2012 to Final Office Action mailed Apr. 27, 2012", 10 pgs.
"U.S. Appl. No. 12/336,460, Advisory Action mailed Jul. 30, 2012", 3 pgs.
"U.S. Appl. No. 12/336,460, Final Office Action mailed Apr. 27, 2012", 8 pgs.
"U.S. Appl. No. 12/875,646, Response filed Jul. 30, 2012 to Non Final Office Action mailed Jan. 30, 2012", 7 pgs.
"European Application Serial No. 07839768.4, Response filed Apr. 5, 2012 to Office Action mailed Dec. 9, 2011", 20 pgs.
Haykin, Simon, "Adaptive Filter Theory: 3rd Edition", Prentice Hall, (1996), 3 pgs.
Haykin, Simon, "Adaptive Filter Theory: Third Edition: Appendix G Gradient Adaptive Lattice Algorithm", Prentice Hall, (1996), 5 pgs.
"U.S. Appl. No. 11/877,317, Notice of Allowance mailed Sep. 17, 2012", 8 pgs.
"U.S. Appl. No. 11/877,605, Non Final Office Action mailed Nov. 20, 2012", 8 pgs.
"U.S. Appl. No. 12/336,460, Non Final Office Action mailed Nov. 26, 2012", 6 pgs.
"U.S. Appl. No. 12/875,646, Final Office Action mailed Oct. 25, 2012", 10 pgs.
"U.S. Appl. No. 12/980,720, Non Final Office Action mailed Dec. 14, 2012", 10 pgs.
"European Application Serial No. 07839766.8, Office Action mailed Jun. 8, 2009", 2 pgs.
"European Application Serial No. 07839766.8, Office Action mailed Jul. 2, 2009", 2 pgs.
"European Application Serial No. 07839766.8, Office Action mailed Sep. 17, 2012", 10 pgs.
"European Application Serial No. 07839767.6, Office Action mailed Mar. 8, 2012", 27 pgs.
"European Application Serial No. 07839767.6, Decision to Grant mailed Jul. 19, 2012", 2 pgs.
Spreiet, Ann, et al., "Adaptive Feedback Cancellation in Hearing Aids With Linear Prediction of the Desired Signal", IEEE Transactions on Signal Processing 53(10), (Oct. 2005), 3749-3763.
Theverapperurna, Lalin S, et al., "Adaptive Feedback Canceller: Entrainment", Digital Signal Processing Workshop, 12th—Signal Processing Education Workshop, 4th, IEEE, (2006), 245-250.
U.S. Appl. No. 11/877,317, Notice of Allowance mailed Jan. 31, 2013, 8 pgs.
U.S. Appl. No. 11/877,605, Notice of Allowance mailed Apr. 10, 2013, 11 pgs.
U.S. Appl. No. 11/877,605, Response filed Mar. 20, 2013 to Non Final Office Action mailed Nov. 20, 2012, 8 pgs.
U.S. Appl. No. 12/336,460, Notice of Allowance mailed May 10, 2013, 9 pgs.
U.S. Appl. No. 12/336,460, Response filed Apr. 26, 2013 to Non final Office Action mailed Nov. 26, 2012, 8 pgs.
U.S. Appl. No. 12/875,646, Non Final Office Action mailed May 10, 2013, 9 pgs.
U.S. Appl. No. 12/875,646, Response filed Apr. 25, 2013 to Final Office Action mailed Oct. 25, 2012, 9 pgs.
U.S. Appl. No. 12/980, Response filed May 14, 2013 to Non Final Office Action mailed Dec. 14, 2013, 8 pgs.
U.S. Appl. No. 12/980,720, Notice of Allowance mailed May 29, 2013, 8 pgs.
European Application Serial No. 07839766.8, Response filed Jan. 11, 2013 to Office Action mailed Sep. 17, 2012, 16 pgs.
Jenkins, W. Kenneth, et al., "Chapter 22—Transform Domain Adaptive Filtering", The Digital Signal Processing Handbook, Editors, Vijay K. Madisetti, Douglas B. Williams; Boca Raton, FL:CRC Press, (1998), 22-1-22-20.

* cited by examiner

ENTRAINMENT AVOIDANCE WITH AN AUTO REGRESSIVE FILTER

CLAIM OF PRIORITY AND RELATED APPLICATION

This application claims the benefit under 35 U.S.C. 119(e) of U.S. Provisional Patent Application Ser. No. 60/862,526, filed Oct. 23, 2006, the entire disclosure of which is hereby incorporated by reference in its entirety.

TECHNICAL FIELD

The present subject matter relates generally to adaptive filters and in particular to method and apparatus to reduce entrainment-related artifacts for hearing assistance systems.

BACKGROUND

Digital hearing aids with an adaptive feedback canceller usually suffer from artifacts when the input audio signal to the microphone is periodic. The feedback canceller may use an adaptive technique, such as a N-LMS algorithm, that exploits the correlation between the microphone signal and the delayed receiver signal to update a feedback canceller filter to model the external acoustic feedback. A periodic input signal results in an additional correlation between the receiver and the microphone signals. The adaptive feedback canceller cannot differentiate this undesired correlation from that due to the external acoustic feedback and borrows characteristics of the periodic signal in trying to trace this undesired correlation. This results in artifacts, called entrainment artifacts, due to non-optimal feedback cancellation. The entrainment-causing periodic input signal and the affected feedback canceller filter are called the entraining signal and the entrained filter, respectively.

Entrainment artifacts in audio systems include whistle-like sounds that contain harmonics of the periodic input audio signal and can be very bothersome and occurring with day-to-day sounds such as telephone rings, dial tones, microwave beeps, instrumental music to name a few. These artifacts, in addition to being annoying, can result in reduced output signal quality. Thus, there is a need in the art for method and apparatus to reduce the occurrence of these artifacts and hence provide improved quality and performance.

SUMMARY

This application addresses the foregoing needs in the art and other needs not discussed herein. Methods and apparatus embodiments are provided to avoid entrainment of feedback cancellation filters in hearing assistance devices. Various embodiments include using a auto regressive unit with an adaptive filter to measure an acoustic feedback path and deriving an output of the auto regressive unit at least in part from a ratio of a predictive estimate of an input signal to a difference of the predictive estimate and the input signal. Various embodiments include using the ratio output of the auto regressive unit to adjust the adaptation rate of the adaptive feedback cancellation filter to avoid entrainment.

Embodiments are provided that include a microphone, a receiver and a signal processor to process signals received from the microphone, the signal processor including an adaptive feedback cancellation filter, the adaptive feedback cancellation filter adapted to provide an estimate of an acoustic feedback path for feedback cancellation. Embodiments are provided that also include a predictor filter to provide a power ratio of a predicted input signal error and a predicted input signal, the power ratio indicative of entrainment of the adaptive filter, wherein the predicted input signal error includes a measure of the difference between the predicted input signal and the first input signal.

This Summary is an overview of some of the teachings of the present application and is not intended to be an exclusive or exhaustive treatment of the present subject matter. Further details about the present subject matter are found in the detailed description and the appended claims. The scope of the present invention is defined by the appended claims and their legal equivalents.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1A:
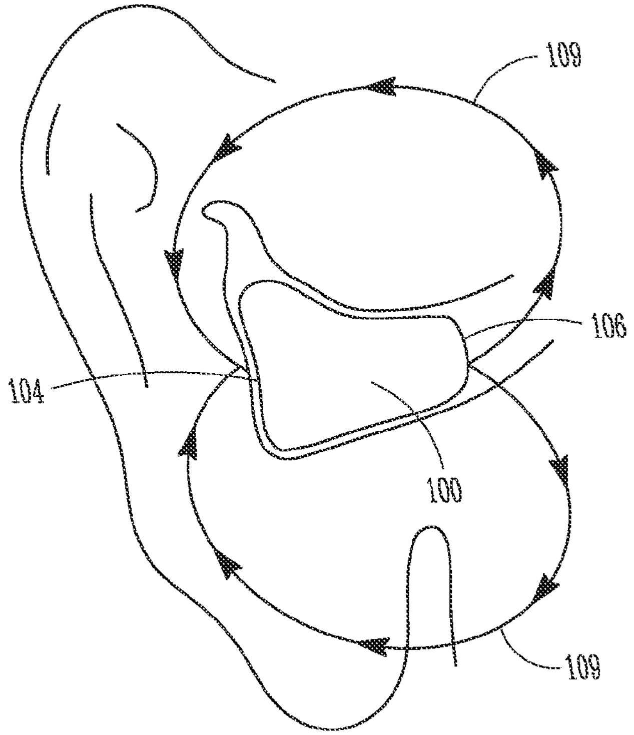
FIG. 1A is a diagram demonstrating, for example, an acoustic feedback path for one application of the present system relating to an in the ear hearing aid application, according to one application of the present system.

FIG. 1A is a diagram demonstrating, for example, an acoustic feedback path for one application of the present system relating to an in-the-ear hearing aid application, according to one application of the present system. In this example, a hearing aid 100 includes a microphone 104 and a receiver 106. The sounds picked up by microphone 104 are processed and transmitted as audio signals by receiver 106. The hearing aid has an acoustic feedback path 109 which provides audio from the receiver 106 to the microphone 104. It is understood that the invention may be applied to a variety of other systems, including, but not limited to, behind-the-ear systems, in-the-canal systems, completely in the canal systems and system incorporating prescriptive or improved hearing assistance programming and variations thereof.

Figure 1B:
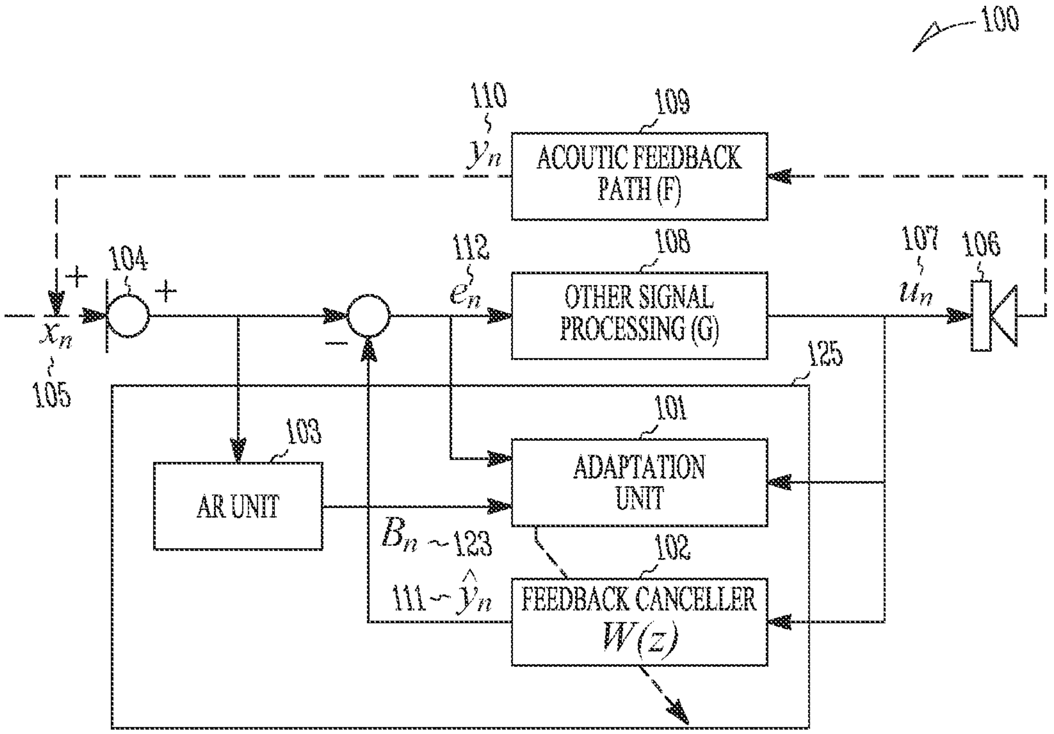
FIG. 1B illustrates a system with an adaptive feedback canceling apparatus, including an adaptation unit and a feedback canceller, and an auto regressive unit according to one embodiment of the present subject matter.

FIG. 1B illustrates a system 100, such as a hearing assistance device, with an adaptive feedback canceling apparatus 125, including an adaptation unit 101 and a feedback canceller 102, and an auto regressive unit 103 according to one embodiment of the present subject matter. FIG. 1B includes an input device 104 receiving a signal x(n) 105, an output device 106 sending a signal u(n) 107, a module for other processing and amplification 108, an acoustic feedback path 109 with an acoustic feedback path signal $y_n$ 110, an adaptive feedback cancellation filter 102 and an adaptation unit 101 for automatically adjusting the coefficients of the adaptive feedback cancellation filter. In various embodiments, the signal processing module 108 is used to amplify and process the acoustic signal, $e_n$ 112 as is common in Public Address (PA) systems, hearing aids, or other hearing assistance devices for example. In various embodiments, the signal processing module 108 includes prescriptive hearing assistance electronics such as those used in prescriptive hearing assistance devices. In various embodiments, the signal processing module includes an output limiter stage. The output limiting stage is used to avoid the output $u_n$ from encountering hard clipping. Hard clipping can result in unexpected behavior. In various embodiments, the physical receiver and gain stage limitations produce the desired clipping effect. Clipping is common during entrainment peaks and instabilities. During experimentation, a sigmoid clipping unit that is linear from −1 to 1 was used to achieve the linearity without affecting the functionality.

In the illustrated system, at least one feedback path 109 can contribute undesirable components 110 to the signal received at the input 104, including components sent from the output device 106. The adaptive feedback cancellation filter 102 operates to remove the undesirable components by recreating the transfer function of the feedback path and applying the output signal 107 to that function 102. A summing junction subtracts the replicated feedback signal $\hat{y}_n$ 111 from the input signal resulting in a error signal $e_n$ 112 closely approximating the intended input signal without the feedback components 110. In various embodiments, the adaptive feedback cancellation filter 102 initially operates with parameters set to cancel an assumed feedback leakage path. In many circumstances, the actual leakage paths vary with time. The adaptation unit 101 includes an input to receive the error signal 112 and an input to receive the system output signal 107. The adaptation unit 101 uses the error signal 112 and the system output signal 107 to monitor the condition of the feedback path 109. The adaptation unit 101 includes at least one algorithm running on a processor to adjust the coefficients of the feedback cancellation filter 102 to match the characteristics of the actual feedback path 109. The rate at which the coefficients are allowed to adjust is called the adaptation rate.

In general, higher adaptation rates improve the ability of the system to adjust the cancellation of feedback from quickly changing feedback paths. However, an adaptation filter with a high adaptation rate often create and allow correlated and tonal signals to pass to the output. Adaptation filters with lower adaptation rates may filter short burst of correlated input signals, but are unable to filter tonal signals, sustained correlated input signals and feedback signals resulting from quickly changing feedback leakage paths. The illustrated system embodiment of FIG. 1B includes an auto regressive (AR) unit 103 configured to provide one or more ratios $B_n$ to the adaptation unit for the basis of adjusting the adaptation rates of the adaptation unit 101 such that entrainment artifacts resulting from correlated and tonal inputs are eliminated.

Figure 2A:
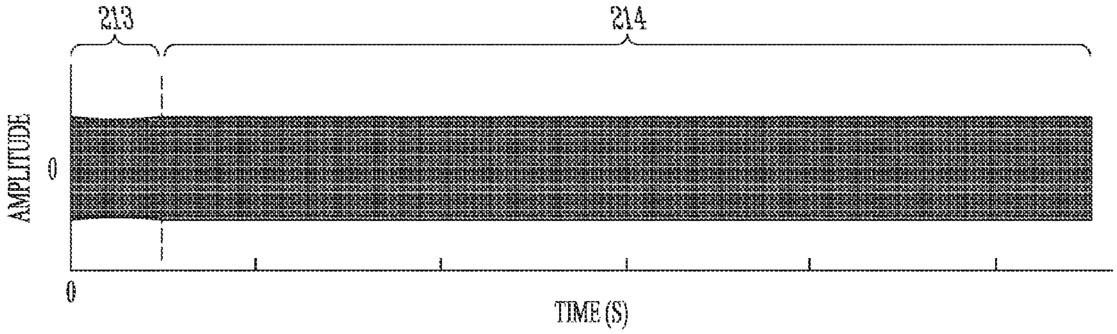
FIGS. 2A and 2B illustrate the response of an adaptive feedback system according one embodiment of the present subject matter with an AR unit enabled, but with the adaptation rates of the adaptation unit held constant.
Figure 2B:
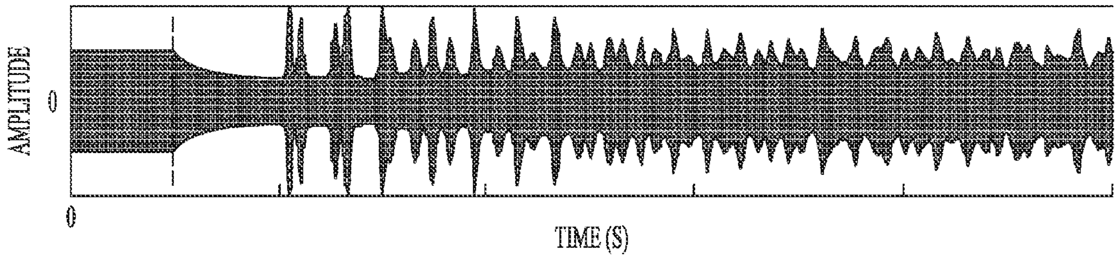

FIGS. 2A-2B illustrate the response of an adaptive feedback system according one embodiment of the present subject matter with an AR unit enabled, but with the adaptation rates of the adaptation unit held constant. The input to the system includes a interval of white noise 213 followed by interval of tonal input 214 as illustrated in FIG. 2A. FIG. 2B illustrates the output of the system in response to the input signal of FIG. 2A. As expected, the system's output tracks a white noise input signal during the initial interval 213. When the input signal changes to a tonal signal at 215, FIG. 2B shows the system is able to output an attenuated signal for a short duration before the adaptive feedback begins to entrain to the tone and pass entrainment artifacts 216 to the output. The entrainment artifacts are illustrated by the periodic amplitude swings in the output response of FIG. 2B.

Figure 3:
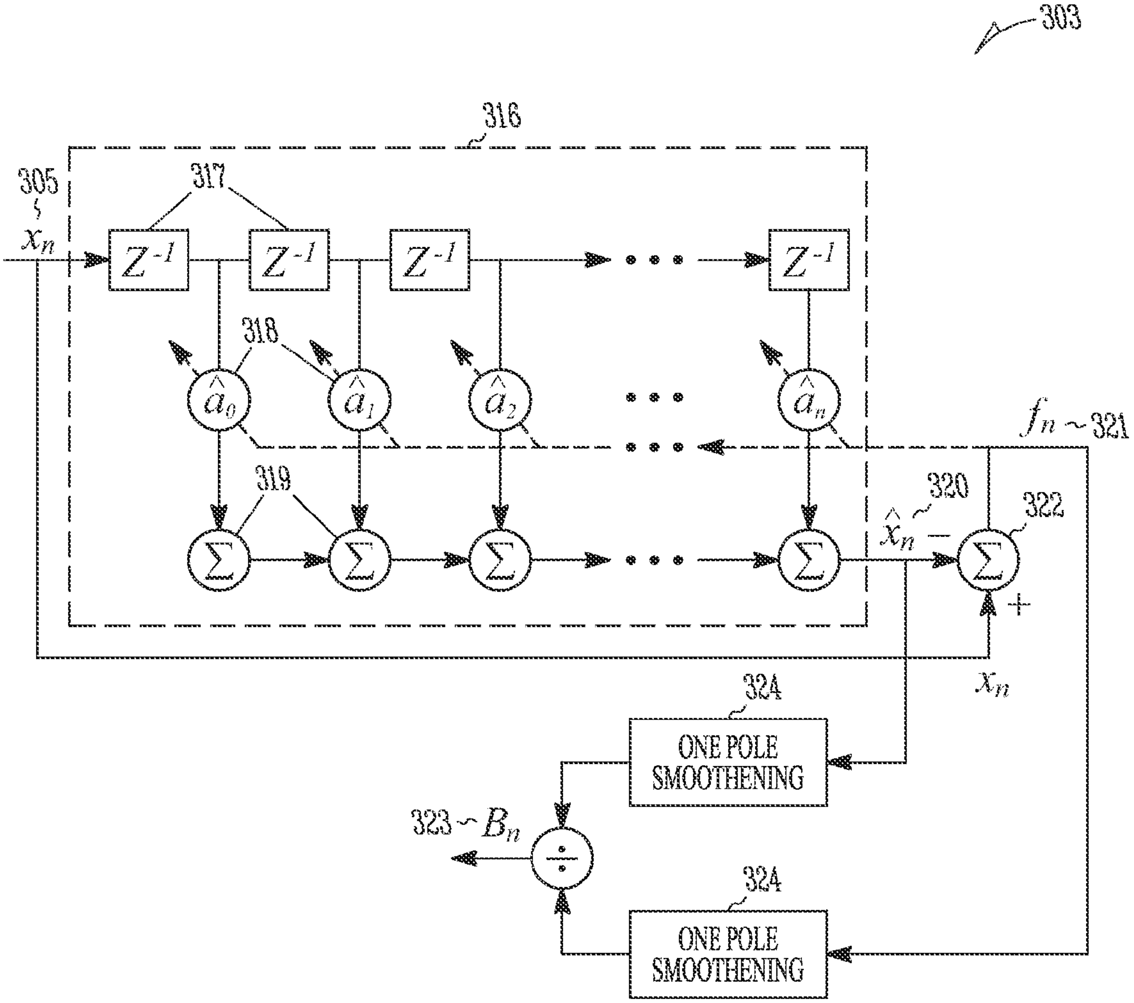
FIG. 3 illustrates an auto regressive (AR) unit according to one embodiment of the present subject matter.

FIG. 3 illustrates an auto regressive (AR) unit 303 according to one embodiment of the present subject matter. In general, the AR unit uses autoregressive analysis to predict the input signal based on past input signal data. As will be shown, the AR unit is adapted to predict correlated and tonal input signals. FIG. 3 shows an input signal, $x_n$, 305 received by an adaptive prediction error filter 316 or all-zero filter. The adaptive prediction error filter 316 includes one or more delay 317 and coefficient 418 elements. Embodiments with more than one delay 317 and coefficient 318 elements include one or more summing junctions 319 used to produce a predicted input signal $\hat{x}_n$ 320. A predicted input error signal, $f_n$, 321 is determined at a summing junction 322 adding the actual input signal 305 to the inverted predicted input signal 320. The adaptive prediction error filter 316 adjusts the coefficient elements 318 of the filter according to an algorithm designed to flatten the spectrum of the filter's output.

The AR unit 303 is further adapted to provide at least one parameter $B_n$ 323 upon which the adaptation unit 101 of FIG. 1B determines adjustments to the adaptation rate of adaptive feedback cancellation unit 102 to prevent the introduction of entrainment artifacts. In various embodiments, the one or more $B_n$ parameters 323 are ratios formed by dividing the predicted input error signal 321 power by the predicted input signal 320 power. In various embodiments, single pole smoothing units 324 are used to determine the one or more $B_n$ parameters 323. In various embodiments, the at least one $B_n$ parameter 323 provides an indication of the absence of correlated or tonal inputs whereby, the adaptation unit 101 uses more aggressive adaptation to adjust the adaptive feedback canceller's coefficients.

The adaptive prediction error filter 316 is able to predict correlated and tonal input signals because it has been shown that white noise can be represented by a $P^{th}$-order AR process and expressed as:

$$x_n = \sum_{i=1}^{P-1} \hat{a}_n(i) x_{n-i} + f_n$$

This equation can also be rearranged as $$f_n = \sum_{i=0}^{P-1} \hat{a}_n(i) x_{n-i}$$

where, $$a_n(k) = \begin{cases} 1 & k = 0 \\ -\hat{a}_n(k) & k = 1, 2, \ldots P \end{cases}$$

and $f_n$ is the prediction error, $a_n(0), \ldots, a_n(i)$ and $a_n(P)$ are AR coefficients. It has been shown that if P is large enough, $f_n$ is a white sequence. The main task of AR modeling is to find optimal AR coefficients that minimize the mean square value of the prediction error. Let $x_n=[X_{n-1} \ldots X_{n-P}]^T$ be an input vector. The optimal coefficient vector $A^*_n$ is known to be the Wiener solution given by $$A_n^*=[a_n(0)^*,a_n(1), \ldots ,a_n(P-1)^*]^T=R_n^{-1}r_n$$

where $R_n=E\{x_n x_n^T\}$ input autocorrelation matrix and $r_n=E\{x_n x_n\}$.

The prediction error $f_n$ is the output of the adaptive pre whitening filter $A_n$ which is updated using the LMS algorithm $$A_{n+1} = A_n + \frac{\eta x_n^* f_n}{|x_n|^2 + \zeta}$$

where $$f_n=x_n-\hat{x}_n$$

is the prediction error and $$\hat{x}n=x_n^T A_n$$

is the prediction of $x_n$ the step size $\eta$ determines the stability and convergence rate of the predicator and stability of the coefficients. It is important to note that $A_n$ is not in the cancellation loop. In various embodiments $A_n$ is decimated as needed. The weight update equation, $$A_{n+1} = A_n + \frac{\eta x_n^* f_n}{|x_n|^2 + \zeta}$$

is derived through a minimization of the mean square error (MSE) between the desired signal and the estimate, namely by $$E\{|f_n|^2\}=E\{[x_n-\hat{x}_n]^2\}.$$

The forward predictor error power and the inverse of predictor signal power form an indication of the correlated components in the predictor input signal. The ratio of the powers of predicted signal to the predictor error signal is used as a method to identify the correlation of the signal, and to control the adaptation of the feedback canceller to avoid entrainment. A one pole smoothened forward predictor error, $f_n$, is given by $$\grave{f}_n=\beta\grave{f}_{n-1}+(1-\beta)|f_n|$$

where $\beta$ is the smoothening coefficient and takes the values for $\beta<1$ and $f_n$ is the forward error given in the equation $$f_n=x_n-\hat{x}_n$$

The energy of the forward predictor $\hat{x}_n$ can be smoothened by $$\grave{x}_n=\beta\grave{x}_n+(1-\beta)|\hat{x}_n|.$$

The non-entraining feedback cancellation is achieved by combining these two measures with the variable step size Normalized Least Mean-Square (NLMS) adaptive feedback canceller, where adaptation rate $\mu_n$ is a time varying parameter given by $$W_{n+1} = W_n + \frac{\mu_n u_n^* e_n}{|u_n|^2 + \zeta}$$

where $u_n=[u_n, \ldots, u_{n-M+1}]^T$, and $e_n=y_n-\hat{y}_n+x_n$ as shown in FIG. 1B and $$B_n = \frac{\grave{f}_n}{\grave{x}_n},$$

and $$u_n = u_0 B_n,$$

where $u_0$ is a predetermined constant adaptation rate decided on the ratio of $f_n$ and $x_n$ for white noise input signals. In this method, the adaptation rate of the feedback canceller is regulated by using the autoregressive process block (AR unit). When non-tonal signal (white noise) is present, the forward predictor error is large and the forward predictor output is small leaving the ratio large giving a standard adaptation rate suited for path changes. The AR unit provides a predetermined adaptation rate for white noise input signals. When a tonal input is present, the predictor learns the tonal signal and predicts its behavior resulting in the predictor driving the forward predictor error small and predictor output large. The ratio of the forward predictor error over predictor output is made small, which gives an extremely small adaptation rate, and in turn results in the elimination and prevention of entrainment artifacts passing through or being generated by the adaptive feedback cancellation filter.

Figure 4A:
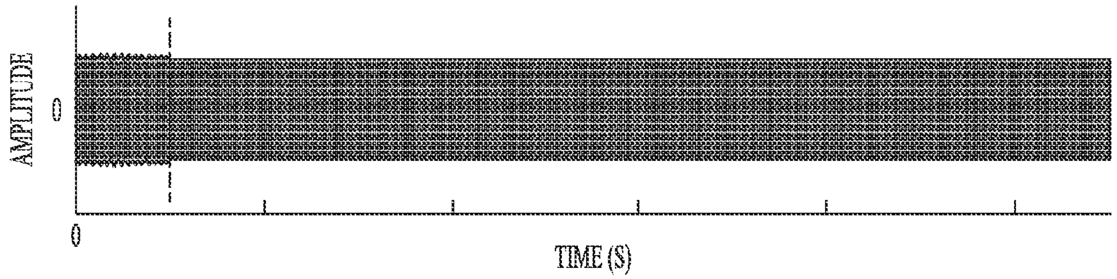
FIGS. 4A, 4B, 4C and 4D illustrate the response of the entrainment avoidance system embodiment of FIG. 1B using the AR unit to adjust the adaptation rates of the adaptation unit to eliminate and prevent entrainment artifacts from the output of the system.
Figure 4B:
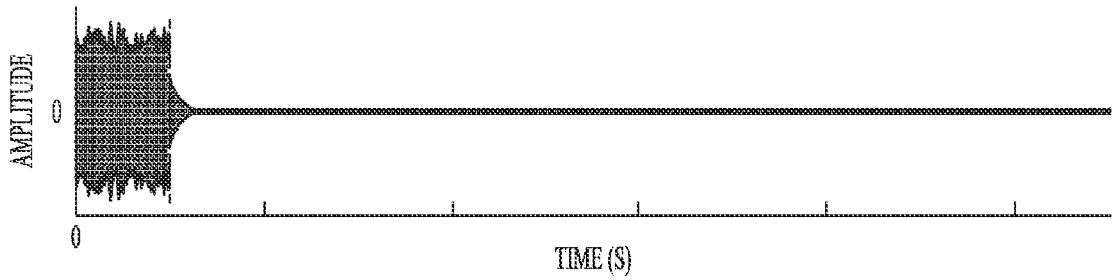
Figure 4C:
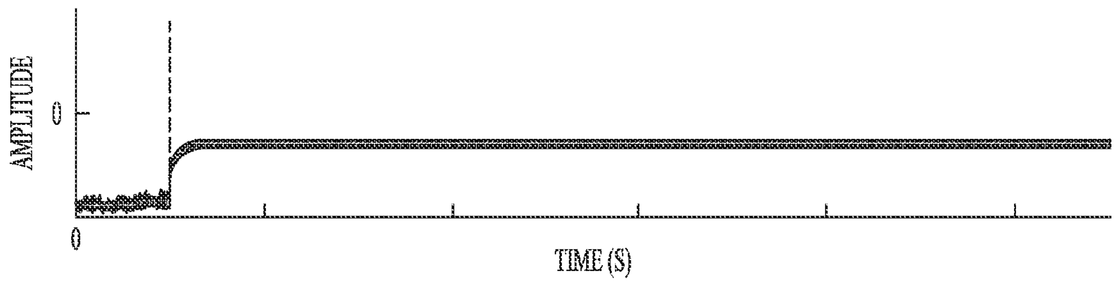
Figure 4D:
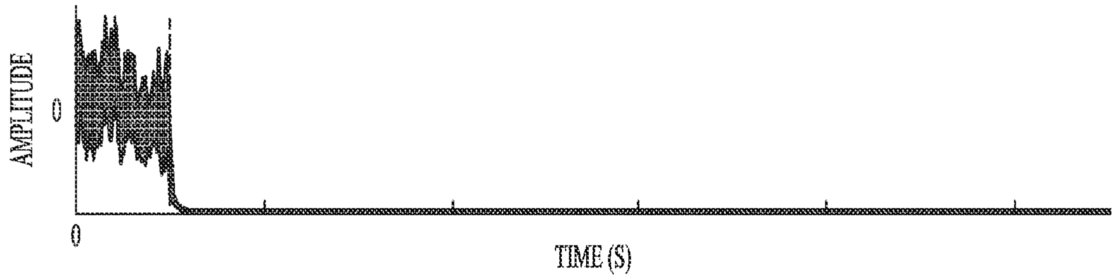

FIG. 4A illustrates the response of the entrainment avoidance system embodiment of FIG. 1B using the AR unit 103 to set the adaptation rates of the adaptation unit 101 to eliminate and prevent entrainment artifacts from the output of the system. FIG. 4A shows the system outputting a interval of white noise followed by a interval of tonal signal closely replicating the input to the system represented by the signal illustrated in FIG. 2A. FIG. 4B illustrates the corresponding temporal response of the predicted input error signal 321 and shows the failure of the adaptive prediction error filter 316 to predict the behavior of a white noise signal. FIG. 4C illustrates the smoothed predicted input signal and shows a small amplitude for the signal during the white noise interval. FIG. 4D illustrates the adaptation rate resulting from the ratio of the predicted input signal error over the predicted input signal. FIG. 4D shows that the adaptation rate is relatively high or aggressive during the interval in which white noise is applied to the system as the predicted input error signal is large and the predicted input signal is comparatively small.

FIGS. 4B and 4C also show the ability of the adaptive prediction error filter 316 to accurately predict a tonal input. FIG. 4B shows a small predicted input error signal during the interval in which the tonal signal is applied to the system compared to the interval in which white noise is applied to the system. FIG. 4C shows a relatively large smoothed predicted input signal during the interval in which the tonal signal is applied to the system compared to the interval in which white noise is applied to the system. In comparing the output signal of the fixed adaptation rate system illustrated in FIG. 2B to the output signal of the entrainment avoidance system illustrated in FIG. 4A, it is observed that the auto recursive unit used to adjust adaptation rates of the adaptation unit eliminates and prevents entrainment artifacts in the output of devices using an entrainment avoidance system according to the present subject matter.

Figure 5:
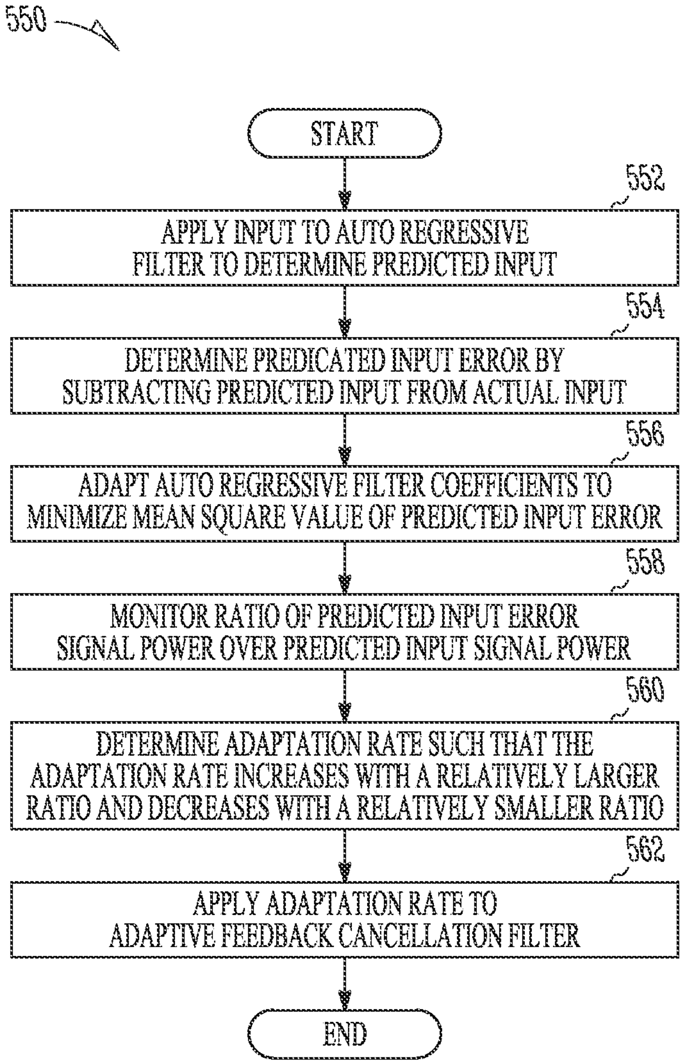
FIG. 5 is a flow diagram showing one example of a method of entrainment avoidance 550 according to the present subject matter.

FIG. 5 is a flow diagram showing one example of a method of entrainment avoidance 550 according to the present subject matter. In this embodiment, the input signal is digitized and a copy of the signal is subjected to an autoregressive filter. The autoregressive filter separates a copy of the input signal into digital delay components. A predicted signal is formed using scaling factors applied to each of the delay components. the scaling factors are based on previous samples of the input signal 552. A predicted signal error is determined by subtracting the predicted signal from the actual input signal 554. The scaling factors of the autoregressive filter are adjusted to minimize the mean square value of the predicted error signal 556. A power ratio of the predicted signal error power and the power of the predicted input signal is determined and monitored 558. Based on the magnitude of the power ratio, the adaptation rate of the adaptive feedback cancellation filter is adjusted 560. As the ratio of the predicted error signal power divided by the signal power rises, the adaptation rate is allowed to rise as well to allow the filter to adapt quickly to changing feedback paths or feedback path characteristics. As the ratio of the predicted error signal power divided by the signal power falls, entrainment becomes more likely and the adaptation rate is reduced to de-correlate entrainment artifacts. Once the adaptation rate is determined, the adaptation rate is applied to the adaptive feedback canceller filter 562. It is to be understood that some variation in order and acts being performed are possible without departing from the scope of the present subject matter.

Various embodiments of methods according to the present subject matter have the advantage of recovering from feedback oscillation. Feedback oscillations are inevitable in practical electro-acoustic system since the sudden large leakage change often causes the system to be unstable. Once the system is unstable it generates a tonal signal. Most tonal detection methods fail to bring back the system to stability in these conditions. methods according to the present subject matter recover from internally generated tones due to the existence of a negative feedback effect. Consider the situation where the primary input signal is non-correlated and the system is in an unstable state and whistling due to feedback. It is likely that the predicting filter has adapted to the feedback oscillating signal and adaptation is stopped. If the input signal is non-correlated, the predictor filter will not be able to model some part of the input signal ($e_n$). This signal portion allows the step size to be non zero making the main adaptive filter converge to the desired signal in small increments. On each incremental adaptation, the feedback canceller comes closer to the leakage and reduces the unstable oscillation. Reducing the internally created squealing tone, decreases the predictor filter's learned profile. As the predictor filter output diverges from the actual signal, the predicted error increases. As the predicted error increases, the power ratio increases and, in turn, the adaptation rate of the main feedback canceller increases bringing the system closer to stability.

This application is intended to cover adaptations and variations of the present subject matter. It is to be understood that the above description is intended to be illustrative, and not restrictive. The scope of the present subject matter should be determined with reference to the appended claim, along with the full scope of equivalents to which the claims are entitled.

What is claimed is:

1. A method of signal processing an input signal in a hearing aid to avoid entrainment, the hearing aid including a receiver and a microphone, the method comprising:

using an adaptive filter to measure an acoustic feedback path from the receiver to the microphone; and adjusting an adaptation rate of the adaptive filter using an output from a filter having an autoregressive portion to avoid entrainment, wherein the output is derived at least in part from a ratio of a predictive estimate of the input signal to a difference of the predictive estimate and the input signal.

2. The method of claim 1, wherein adjusting the adaptation rate of the adaptive filter using the output from the filter having the autoregressive portion includes updating a plurality of coefficients of the autoregressive portion.

3. The method of claim 1, further comprising sampling the input signal using delay elements to derive the predictive estimate of the input signal.

4. The method of claim 1, further comprising smoothing the predictive estimate of the input signal.

5. The method of claim 1, further comprising smoothing the difference of the predictive estimate and the input signal.

6. The method of claim 1, wherein using the adaptive filter to measure the acoustic feedback path from the receiver to the microphone includes updating one or more coefficients of the adaptive filter.

7. The method of claim 6, wherein updating one or more coefficients of the adaptive filter includes updating the one or more coefficients of the adaptive filter at an update rate determined in part using the output of the filter having the autoregressive portion.

8. An apparatus comprising:

a microphone;

a signal processing component to process a first input signal received from the microphone to form a first processed input signal to avoid filter entrainment, the signal processing component including:

an adaptive filter to provide an estimate of an acoustic feedback signal, a predictor filter having an autoregressive portion to provide a power ratio of a predicted input signal error and a predicted input signal, the power ratio indicative of entrainment of the adaptive filter; and a receiver adapted for emitting sound based on the processed first input signal, wherein the predicted input signal error includes a measure of the difference between the predicted input signal and the first input signal.

9. The apparatus of claim 8, wherein the predictor filter includes at least one smoothing component.

10. The apparatus of claim 8 further comprising an output limiting stage to reduce hard clipping.

11. The apparatus of claim 8, wherein the predictor filter includes a first smoothing component for smoothing the predicted input signal error and a second smoothing component for smoothing the predicted input signal.

12. The apparatus of claim 8, wherein the signal processing component includes instructions to derive the power ratio of the predicted input signal error and the predicted input signal based on the first input signal.

13. The apparatus of claim 8, wherein the signal processing component includes instructions to adjust an adaptation rate of the adaptive filter to avoid entrainment of the adaptive filter.

14. The apparatus of claim 13, wherein the signal processing component includes instructions to raise the adaptation rate of the adaptive filter based on an increasing power ratio of the predicted input signal error and the predicted input signal.

15. The apparatus of claim 13, wherein the signal processing component includes instructions to lower the adaptation rate of the adaptive filter based on decreasing power ratio of the predicted input signal error and the predicted input signal.

16. The apparatus of claim 8, further comprising a housing to enclose the signal processing component.

17. The apparatus of claim 16, wherein the housing includes a behind-the-ear (BTE) housing.

18. The apparatus of claim 16, wherein the housing includes an in-the-canal (ITC) housing.

19. The apparatus of claim 16, wherein the housing includes a completely-in-the-canal (CIC) housing.

20. The apparatus of claim 8, wherein the signal processing component includes instructions for hearing correction.

* * * * *

UNITED STATES PATENT AND TRADEMARK OFFICE

CERTIFICATE OF CORRECTION

PATENT NO. : 8,681,999 B2
APPLICATION NO. : 11/877567
DATED : March 25, 2014
INVENTOR(S) : Theverapperuma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1567 days.

Signed and Sealed this
Twenty-first Day of July, 2015

Michelle K. Lee
*Director of the United States Patent and Trademark Office*